United States Patent [19]

Rumpel

[11] 4,456,282
[45] Jun. 26, 1984

[54] INDEPENDENT REAR WHEEL SUSPENSION WITH A TOE ANGLE CONTROLLING TRAILING ARM

[75] Inventor: Manfred Rumpel, Birmingham, Mich.

[73] Assignee: Ford Motor Company, Dearborn, Mich.

[21] Appl. No.: 334,295

[22] Filed: Dec. 24, 1981

[51] Int. Cl.³ .............................................. B60G 3/00
[52] U.S. Cl. ................................... 280/690; 280/701; 180/73.1
[58] Field of Search ............... 280/690, 689, 688, 701, 280/724, 725, 726; 180/73 TL

[56] References Cited

U.S. PATENT DOCUMENTS

| | | | |
|---|---|---|---|
| 2,104,736 | 1/1938 | Clemons | 280/124 |
| 3,111,307 | 11/1963 | Cuskie | 267/20 |
| 3,177,965 | 4/1965 | Dews | 180/73 |
| 3,189,118 | 6/1965 | Arning | 180/73 |
| 3,202,237 | 8/1965 | Dreisziger | 180/73 |
| 3,327,803 | 6/1967 | Cote et al. | 180/73 |
| 3,481,622 | 12/1969 | Winsen et al. | 280/106.5 |
| 3,573,882 | 4/1971 | Winsen | 280/124 |
| 3,603,422 | 9/1971 | Cordiano | 180/73 |
| 3,693,746 | 9/1972 | Yamamoto | 180/73 |
| 3,759,542 | 9/1973 | Loffler | 280/124 |
| 3,893,701 | 7/1975 | Kroniger | 280/124 |
| 3,926,454 | 12/1975 | Winsen | 280/701 |
| 3,940,161 | 2/1976 | Allison | 280/701 |
| 4,245,853 | 1/1981 | Inoue et al. | 280/701 |
| 4,269,432 | 5/1981 | Inoue et al. | 280/690 |

OTHER PUBLICATIONS

Ford Motor Co., 1981 Shop Manual For Excort/Lynx Automobiles, pp. 14-32-1.

Primary Examiner—Richard A. Bertsch
Attorney, Agent, or Firm—Jerome R. Drouillard; Roger L. May

[57] ABSTRACT

An independent rear wheel suspension for a motor vehicle having front wheel drive includes a wheel support member, and two laterally extending control arms pivotably connected at their outboard ends to the wheel support member and at their inboard ends to the vehicle chassis. The two laterally extending control arms are longitudinally and vertically spaced apart. One arm has an integrally formed spring seat which seats a coil spring interposed between the arm and the vehicle chassis. A trailing arm is rigidly connected to the wheel support member and has its front end connected through a resilient bushing. The resilient bushing has an outer sleeve coaxially mounted about an inner sleeve with layers of bonded elastomeric material and coaxial rings interposed therebetween and bonded to the inner and outer sleeves. In addition, the suspension can be constructed to control toe-in of the rear wheel during jounce or recession of the rear wheel. The central axis of the inner and outer sleeve are angled rearwardly and inboard. The outer sleeve is axially fixed to the front end of the trailing arm and can axially move against the resilient forces of the elastomeric material. As the wheel recesses, the bushing allows the front end of the trailing arm to move inboard and promotes the wheel to toe-in during recession.

10 Claims, 5 Drawing Figures

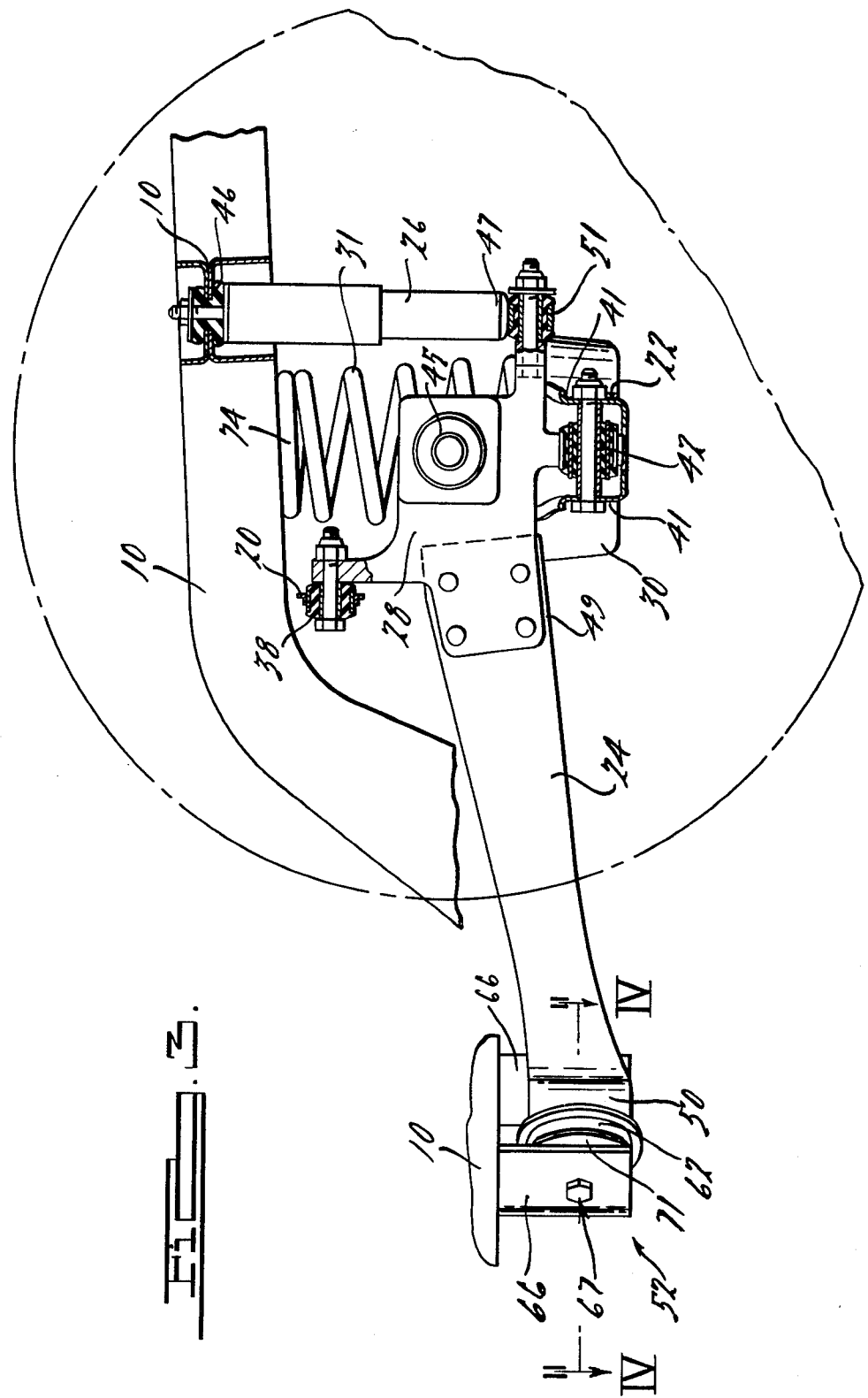

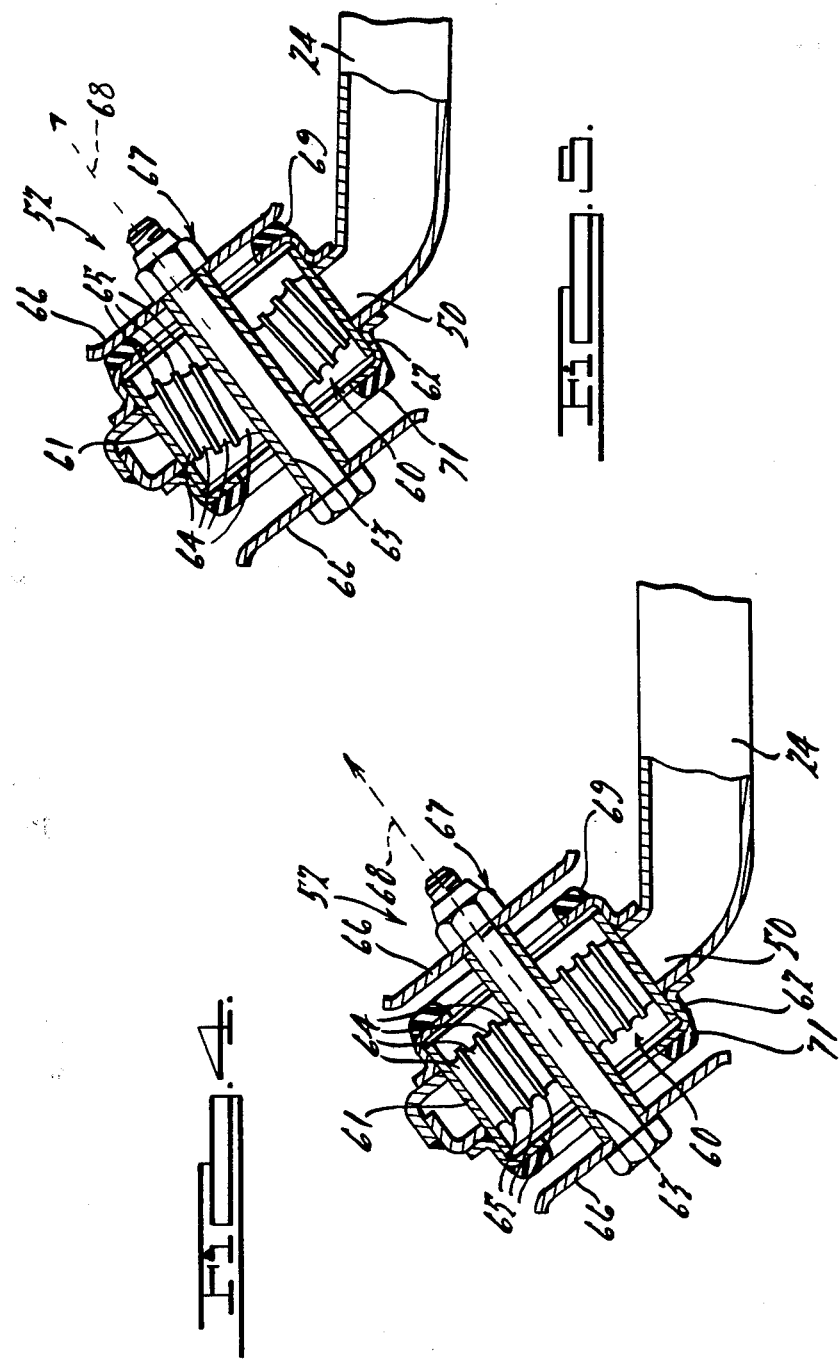

INDEPENDENT REAR WHEEL SUSPENSION WITH A TOE ANGLE CONTROLLING TRAILING ARM

BACKGROUND OF THE INVENTION

1. Field of the Invention

This invention relates generally to independent wheel suspension systems for motor vehicles and more particularly to an independent rear suspension having a trailing arm.

2. Disclosure Information

Rear suspension systems have been constructed to control the attitude of the rear wheels in order to provide particular handling characteristics of the motor vehicle, for example roll understeer, roll oversteer, or roll neutral steer, as well as to provide a soft ride free from road vibrations. Handling characteristics such as roll understeer, roll oversteer, or roll neutral steer during cornering of a motor vehicle are achieved by controlling the toe angle of one of the rear wheels during the jounce stroke of the suspension.

A vibration free ride is enhanced if the rear wheels are allowed to recess when the wheel hits a bump. However, both wheel recession and steering stability must be taken into account when designing a rear suspension. One way to take both factors into account is by controlling the toe angle of the wheel during its recession.

One way to control the toe angle of a wheel is with a suspension having two control arms substantially transverse to the longitudinal axis of the vehicle. The arms control the toe angle changes of the wheels as they shift positions.

However, previous usage of the two transverse control arms in combination with a strut suspension necessitated the spring element in the strut suspension to be mounted about the strut.

In many strut suspensions, the spring has been positioned away from the strut and interposed between a transverse control arm and the chassis so that the strut upper mount can be constructed from softer rubber, and secondly, valuable cargo space or engine compartment space can be maximized.

SUMMARY OF THE DISCLOSURE

In accordance with the present invention, an independent rear wheel suspension for a vehicle includes a chassis, a wheel support member, a shock absorber connected at its lower end to the wheel support member and connected at its upper end to the chassis. Control arms are pivotably connected to the chassis and the wheel support member. A longitudinally extending arm is rigidly connected at its rear end to the wheel support member and has its front end connected through a pivotable connection to the chassis. The pivotable connection allows free rotation about an axis angled rearward and inboard with respect to the vehicle. The pivotable connection includes a resilient bushing which allows the longitudinally extending arm axial movement along the angled axis. The control arms are longitudinally and vertically spaced from each other and substantially transverse to the longitudinal axis of the motor vehicle. A spring seat is integrally formed with the rear control arm for seating a bottom end of a coil spring. The top end of the coil spring abuts the chassis of the motor vehicle.

The broader aspects of the present invention are directed to a chassis, a wheel support member, a control arm which extends substantially transverse to the longitudinal axis of the chassis. The control arm is pivotably connected at its inboard end and its outboard end to the chassis and wheel support member, respectively. A longitudinally extending arm is rigidly connected to the wheel support member and its other end is connected through a pivotable connection to said chassis. The pivotable connection is constructed to allow the trailing arm to control toe-in of the wheel during wheel recession.

A suspension according to the present invention provides for a suspension that can provide roll understeer, roll oversteer, or roll neutral steer, as well as wheel recession. Another aspect of the present invention provides for a longitudinally extending arm that enhances toe-in of the wheel suspension during wheel recession.

BRIEF DESCRIPTION OF THE DRAWINGS

Reference is now made to the accompanying drawings in which:

FIG. 3 is an enlarged side elevational of the left rear wheel suspension shown in FIG. 1.

FIG. 4 is an enlarged fragmentary, and cross-sectional view of the front end of the trailing arm shown and taken along the line IV—IV in FIG. 3.

FIG. 5 is a view similar to FIG. 4 showing the front end of the trailing arm during wheel recession.

DETAILED DESCRIPTION OF THE PREFERRED EMBODIMENTS

Figure 1:
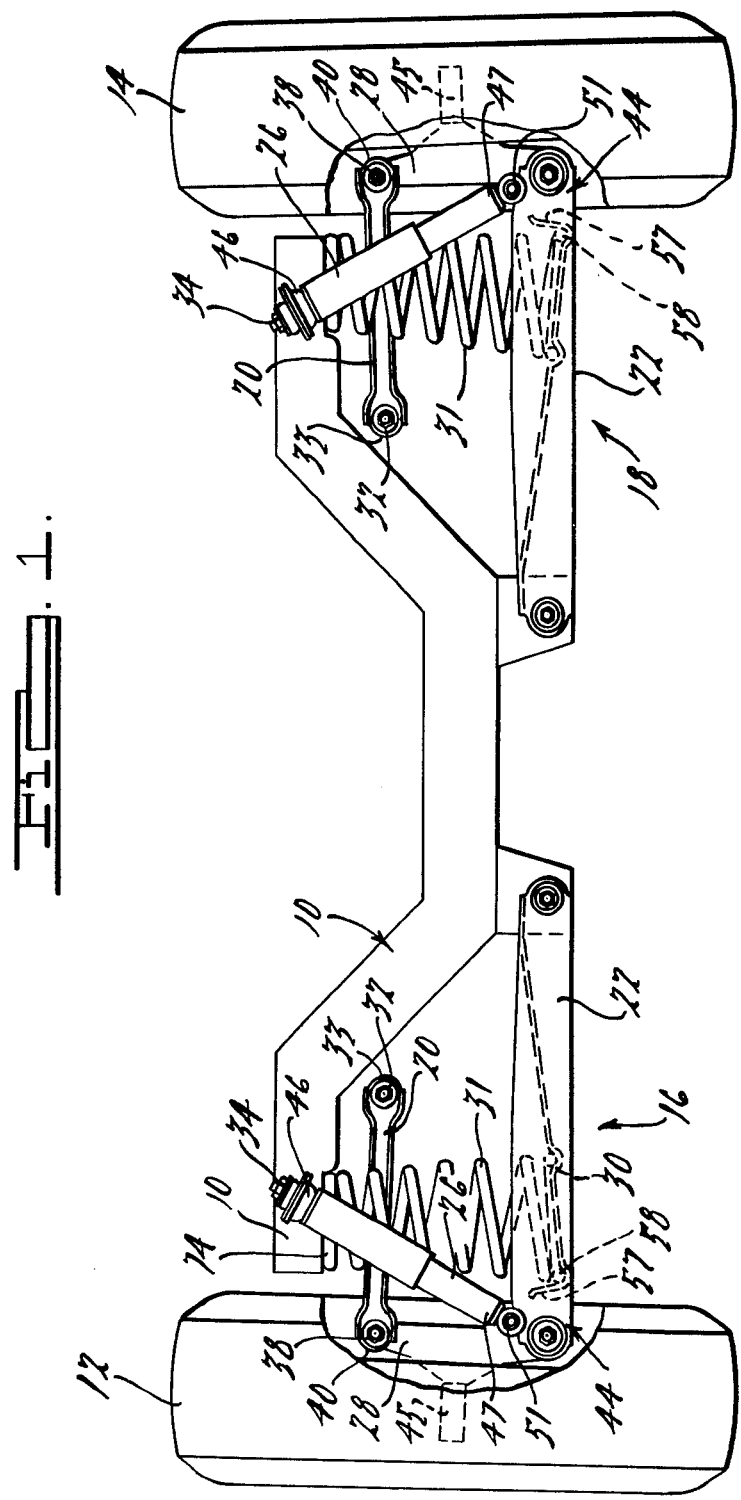
FIG. 1 is a rear elevational view, partly in section, of a motor vehicle incorporating independent rear wheel suspensions for its left and right rear wheels according to the invention.

Referring now to FIG. 1, a motor vehicle chassis (or unitized body and chassis) 10 is supported on left and right road wheels 12 and 14 by novel left and right independent wheel suspensions 16 and 18. Each wheel suspension 16 and 18 is identical except that one is a mirror image of the other; i.e., one is for the left side rather than for the right side. Since each independent suspension is the same, reference will only be made to the left wheel suspension 16.

Figure 2:
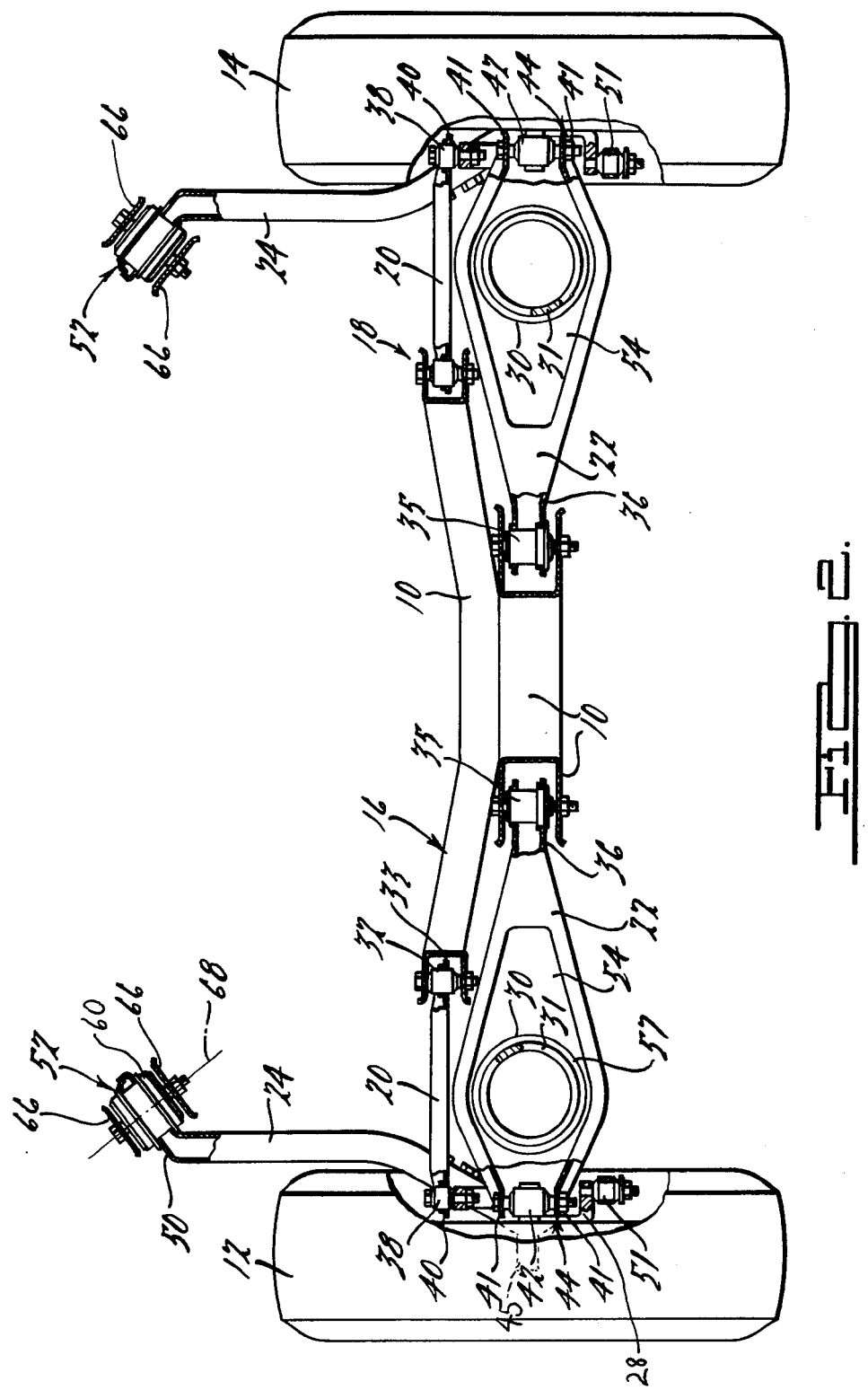
FIG. 2 is a plan view of the rear wheel suspensions shown in FIG. 1.

Generally, as shown in FIGS. 1 and 2, the wheel suspension 16 includes a front upper transverse control arm 20, a rear lower transverse control arm 22, and a trailing arm 24, which connects a wheel support member 28 to the motor vehicle chassis 10. Means are provided to pivotably connect the inner ends of the arms 20, 22 to the chassis 10 and their outer ends to the wheel support member 28, as will be described. A shock absorber 26 is pivotably connected between wheel support member 28 and chassis 10. A spring seat 30 is integrally formed in arm 22 and seats a coil spring 31 interposed between the seat 30 and chassis 10.

The front arm 20 has an elastomeric bushing 32 at its inboard end 33 which pivotably connects the arm 20 to the chassis 10. Similarly, the rear arm 22 has a similar bushing 35 at its inboard end 36 which pivotably connects the arm 22 to the chassis 10. An elastomeric bushing 38 pivotably connects the outboard end 40 of the front control arm 20 to the wheel support member 28. Similarly, a resilient bushing 42 pivotably connects the two prongs 41 of outboard end 44 of the rear control arm 22 to the wheel support member 28.

The wheel support member 28 has an integral wheel spindle 45 which rotatably mounts wheel 12. The spindle 45 is positioned longitudinally between the two prongs 41 of the outboard end 40 of arm 20 and is longitudinally aligned with bushing 42. The wheel support member 28 is connected to the bottom end 47 of the telescopic shock absorber 26 pivotably through bushing 51. The upper end 34 of the shock absorber 26 is pivotably connected through a resilient upper mount 46 to the chassis 10.

As shown in FIG. 3, the longitudinal trailing arm 24 has its rear end 49 rigidly connected to the wheel support member 28 and extends substantially forward therefrom. The arm 24 has its front end 50 resiliently connected through a pivotable connection 52 to the chassis 10.

Referring now to FIG. 4, the pivotable connection 52 includes a bushing assembly 60 having an outer sleeve 61 axially fixed but rotatably mounted within cage 62 formed at the front end 50 of the arm 24. The outer sleeve is coaxially mounted about and connected to an inner sleeve 63 by interposing layers 64 of bonded elastomeric material and coaxial rings 65. The inner sleeve is axially fixed between two flanges 66 by a nut and bolt assembly 67. The flanges 66 are rigidly secured to chassis 10 as shown in FIG. 3.

The central axis indicated as dashed line 68 of the bushing 60 is angled to the rear and inboard with respect to the chassis 10. The cage 62 is sized to have clearance between flanges 66. The cage 62 has an annular rubber bumper 69 and 71 mounted at each end thereof.

The spring seat 30, as shown in FIG. 1, is integrally formed with the rear control arm 22 at a mid-position between the inboard end 36 and outboard end 44 of the arm 22. The spring seat 30 is recessed downward from the central area 54 and connected thereto by a downwardly extending wall section 56. In general, the recessed seat 30 forms a pocket 57 which receives the lower end 58 of coil spring 31 as it is seated against seat 30.

The top end 74 of coil spring 31 is seated against the chassis 10 so that the coil spring 31 normally exerts a downwardly biasing force on the spring seat 30 and control arm 22 when the vehicle is at rest.

When the control arms 20 and 22 undergo jounce movement, the arms 20 and 22 pivot upwardly about the inboard bushings 32 and 35. As the arms 20 and 22 pivot upwardly, the spring seat 30 is moved upward with the arm 20 to compress coil spring 31.

Similarly, when the control arms 20 and 22 undergo rebound movement and pivot downwardly about inboard bushings 32 and 35, the spring seat 30 moves downwardly and allows coil spring 31 to elongate.

Arms 20 and 22 and the other suspension components may be arranged to provide an increase in camber and an increase in toe-in during jounce of wheel 12. Alternatively, no toe change or toe out may be provided during jounce of wheel 12. One skilled in the art can provide the appropriate geometry of the various suspension arms that will provide the desired toe angle changes during jounce.

The plurality of resilient bushings in the suspension system allow the road wheel to recess when subjected to a longitudinal force such as occurs when the wheel strikes a road obstacle (e.g., a tar strip in concrete pavement). The control arms 20 and 22 control the toe angle of the rear wheel 12 during recession of the wheel. Arms 20 and 22 and the other suspension components may be arranged to provide no toe change during recession of the wheel. Alternatively, the arms 20 and 22 may be arranged to provide toe-in as the wheel undergoes recession.

In addition, the trailing arm 24 promotes toe-in of the wheel during recession due to its resilient bushings 60. Referring to FIG. 5, the bushing 60 allows the front end 50 to move rearwardly and inboard. As the wheel recesses and front end 50 moves rearwardly and inboard, the trailing arm 24 rigidly fixed to the support member 28 changes its toe angle which in turn forces the wheel support member 28 to follow. The bushing by allowing its outer sleeve to move with respect to its inner sleeve and both sleeves having their central axes angled rearwardly and inboard allows recession and provides control of the toe angle during said recession. Furthermore, the flanges 66 and annular elastomeric bumper 69 prevent excessive recession and prevents bushing 60 from exceeding its elastic limit. When the wheel recession ceases, the bushing 60 returns to its position as shown in FIG. 4.

In this fashion, a suspension as described can be constructed to provide roll understeer, roll oversteer or roll neutral steer as well as wheel recession. In addition, the toe angle change during wheel jounce and wheel recession can be controlled in an efficient manner.

Variations and modifications of the present invention are possible without departing from its spirit and scope as defined by the appended claims.

The embodiments in which an exclusive property or privilege is claimed are defined as follows:

1. An independent rear wheel suspension for a vehicle comprising:
    a chassis;
    a wheel support member;
    shock absorbing means having one portion thereof operably connected to said wheel support member and another portion connected to said chassis;
    at least one transversely extending control arm pivotably connected at its inboard end to said chassis and at its outboard end to said wheel support member;
    a spring seat seating a spring means operably interposed between said wheel support member and said chassis;
    a longitudinally extending arm having a front end connected to said chassis and its other end rigidly connected to said wheel support member;
    means for directing said longitudinally extending arm inboard during wheel recession to enhance toe-in of said wheel during wheel recession.

2. An independent rear wheel suspension as defined in claim 1 wherein said means comprises:
    said front end of said longitudinally extending arm being pivotably connected to said chassis about an axis angled rearwardly and inboard with respect to said chassis;
    a resilient bushing connecting said front end of said longitudinally extending arm to said chassis about said axis and constructed to allow movement of said arm along said axis against a resilient force of said bushing.

3. An independent rear suspension as defined in claim 2 wherein said bushing comprises:

an outer sleeve axially fixed to one of said longitudinally extending arm and said chassis;

an inner sleeve axially fixed to the other of said longitudinally extending arm and said chassis;

said sleeves being coaxially mounted and aligned with said axis angled rearwardly and inboard with respect to said chassis;

at least one layer of elastomeric material bonded between said inner and outer sleeves to provide a resilient force against axial movement of said outer sleeve with respect to said inner sleeve.

4. An independent rear wheel suspension as defined in claim 3 further comprising:

a resilient stop means for limiting movement of said longitudinally extending arm along said axis.

5. An independent rear wheel suspension as defined in claim 2 further comprising:

a resilient stop means for limiting movement of said longitudinal extending arm along said axis.

6. An independent rear wheel suspension for a vehicle comprising:

a chassis;

a wheel support member adapted to rotatably mount a wheel;

an upwardly extending telescopic shock absorber having its lower end operably connected to said wheel support member;

means pivotably connecting the upper end of said shock absorber to said chassis;

a first transversely extending control arm pivotably connected at its inboard end to said chassis and at its outboard end to said wheel support member;

a second transversely extending control arm vertically and longitudinally displaced from said first control arm;

a spring seat means integrally formed with one of said arms and seating a spring means interposed between said spring seat means and said chassis;

a longitudinally extending arm having a front end connected to said chassis and its other end rigidly connected to said wheel support member;

means for directing said longitudinally extending arm inboard during wheel recession to enhance toe-in of said wheel during wheel recession.

7. An independent rear wheel suspension as defined in claim 6 wherein said means comprises:

said front end of said longitudinally extending arm being pivotably connected to said chassis about an axis angled rearwardly and inboard with respect to said chassis;

a resilient bushing connecting said front end of said longitudinally extending arm to said chassis about said axis and constructed to allow movement of said arm along said axis against a resilient force of said bushing.

8. An independent rear suspension as defined in claim 7 wherein said bushing comprises:

an outer sleeve axially fixed to one of said longitudinally extending arm and said chassis;

an inner sleeve axially fixed to the other of said longitudinally extending arm and said chassis;

said sleeves being coaxially mounted and aligned with said axis angled rearwardly and inboard with respect to said chassis;

at least one layer of elastomeric material bonded between said inner and outer sleeves to provide a resilient force against axial movement of said outer sleeve with respect to said inner sleeve.

9. An independent rear wheel suspension as defined in claim 8 further comprising:

a resilient stop means for limiting movement of said longitudinally extending arm along said axis.

10. A pivotable connection for a wheel suspension comprising:

an outer sleeve axially fixed to one member of said suspension;

an inner sleeve axially fixed to a second member;

a first layer of elastomeric material bonded to said inner sleeve;

a second layer of elastomeric material bonded to said outer sleeve;

a rigid ring coaxially interposed between said inner and outer sleeve and bonded between said layers of elastomeric materia;

stop means for limiting axial movement of outer sleeve with respect to said inner sleeve against the resilient forces of said elastomeric layers.

* * * * *